US012666508B2

(12) United States Patent
Guo et al.

(10) Patent No.: US 12,666,508 B2
(45) Date of Patent: Jun. 23, 2026

(54) CONTROL SIGNAL TRANSMISSION METHOD FOR LAMP SYSTEM

(71) Applicant: Guangzhou Rising Dragon Recreation Industrial Co., Ltd., Guangzhou (CN)

(72) Inventors: Ziqin Guo, Guangzhou (CN); Bo Liang, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 41 days.

(21) Appl. No.: 18/900,729

(22) Filed: Sep. 28, 2024

(65) Prior Publication Data

US 2026/0006691 A1 Jan. 1, 2026

(30) Foreign Application Priority Data

Jun. 28, 2024 (CN) ......................... 202410858209.5
Jun. 28, 2024 (CN) ......................... 202421511269.1

(51) Int. Cl.
*H05B 45/20* (2020.01)

(52) U.S. Cl.
CPC .................................... *H05B 45/20* (2020.01)

(58) Field of Classification Search
CPC ........ H05B 45/10; H05B 45/20; H05B 45/30; H05B 45/34; H05B 45/40; H05B 47/00; Y02B 20/40
See application file for complete search history.

(56) References Cited

U.S. PATENT DOCUMENTS

2006/0273331 A1* 12/2006 Lim ....................... H05B 45/20 257/80
2010/0141169 A1* 6/2010 Summerland ........ H05B 45/355 315/291
2025/0142705 A1* 5/2025 Guo ..................... H05B 45/325

* cited by examiner

*Primary Examiner* — Jimmy T Vu
(74) *Attorney, Agent, or Firm* — Frank Niranjan

(57) ABSTRACT

An LED lamp system driven by a two-wire transmission circuit, includes an LED lamp with red lamp beads, green lamp beads and blue lamp beads; a red-line control signal detecting circuit configured to detect a red-line control signal from a combined control signal transmitted by the two-wire transmission circuit and output the red-line control signal to the red lamp beads; a green-line control signal detecting circuit configured to detect a green-line control signal from the combined control signal transmitted by the two-wire transmission circuit and output the green-line control signal to the green lamp beads; and a blue-line control signal detecting circuit configured to detect a blue-line control signal from the combined control signal transmitted by the two-wire transmission circuit and output the blue-line control signal to the blue lamp beads.

13 Claims, 12 Drawing Sheets

CONTROL SIGNAL TRANSMISSION METHOD FOR LAMP SYSTEM

The present application is related to the co-pending application Ser. No. 18/898,738, filed on Sep. 27, 2024, entitled "control signal transmission method for lamp system" and the co-pending application Ser. No. 18/900,726, filed on Sep. 28, 2024, entitled "luminaire system and method thereof".

FIELD

The invention relates to signal transmission methods, in particular to a control signal transmission method for a lamp system.

BACKGROUND

In a traditional lamp system, power and control signals are synchronously transmitted by a four-wire system to drive lamps. The four-wire system comprises RGB signal wires and a power wire. Compared with a two-wire system, the four-wire system uses more wires, which are complex and difficult to organize during installation, leading to a higher installation cost, use cost and maintenance cost. However, in existing lamp systems, control signals are transmitted by the RGB signal wires in the four-wire system lamps to drive lamps. The four-wire system does not have a fixed voltage output during the transmission process, so system expansion of the four-wire system is limited because control data output by a controller or a converter connected to the four-wire system may be lost due to the lack of a fixed voltage output during control signal transmission. Therefore, an improved control signal transmission method is needed to transform a four-wire lamp system into a two-wire system under the precondition that the control effect of lamps based on control signals is maintained.

SUMMARY

In view of the defects of existing four-wire lamp systems, the invention provides a control signal transmission method for a lamp system, which makes it possible to transmit control signals by means of a two-wire system by changing the transmission form of the control signals.

The present invention provides an LED lamp system driven by a two-wire transmission circuit. The LED lamp system comprises at least one LED lamp with red lamp beads, green lamp beads and blue lamp beads; a red-line control signal detecting circuit configured to detect a red-line control signal from a combined control signal transmitted by the two-wire transmission circuit and output the red-line control signal to the red lamp beads; a green-line control signal detecting circuit configured to detect a green-line control signal from the combined control signal transmitted by the two-wire transmission circuit and output the green-line control signal to the green lamp beads; and a blue-line control signal detecting circuit configured to detect a blue-line control signal from the combined control signal transmitted by the two-wire transmission circuit and output the blue-line control signal to the blue lamp beads.

Preferably, the at least one LED lamp comprise at least one common-anode LED lamp or at least one common-cathode LED lamp.

Preferably, the at least one LED lamp further comprises a reverse-connection correcting circuit which is arranged between the two-wire transmission circuit and one or more of the red-line control signal detecting circuit, the green-line control signal detecting circuit and the blue-line control signal detecting circuit.

Preferably, the reverse-connection correcting circuit is a bridge rectifier circuit which comprises four diodes connected end-to-end to four nodes between adjacent diodes; and a positive wire of the two-wire transmission circuit, a ground wire, a negative wire of the two-wire transmission circuit, and a common wire of the red-line control signal detecting circuit, the green-line control signal detecting circuit and the blue-line control signal are connected to the four nodes respectively.

Preferably, the red-line control signal detecting circuit is configured for detecting/extracting the red-line control signal with a level of 6 V from the combined control signal transmitted by the two-wire transmission circuit to obtain an extracted red-line control signal with a level of 6 V and outputting the extracted red-line control signal with the level of 6 V to the red lamp beads.

The green-line control signal detecting circuit is configured for extracting the green-line control signal with a level of 8 V from the combined control signal transmitted by the two-wire transmission circuit to obtain an extracted green-line control signal with a level of 8 V and outputting the extracted green-line control signal with the level of 8 V to the green lamp beads.

The blue-line control signal detecting circuit is configured for extracting the blue-line control signal with a level of 9 V from the combined control signal transmitted by the two-wire transmission circuit to obtain an extracted blue-line control signal with a level of 9 V and outputting the extracted blue-line control signal with the level of 9 V to the red lamp beads.

Preferably, an on-voltage of the red-line control signal detecting circuit is 6-6.8 V, an on-voltage of the green-line control signal detecting circuit is 8-8.2 V, and an on-voltage of the blue-line control signal detecting circuit is 9-9.1 V.

Preferably, the red-line control signal detecting circuit is provided with a first diode which has an on-voltage lower than 6.8 V; the green-line control signal detecting circuit is provided with a second diode which has an on-voltage higher than 6.8 V and a third diode which has an on-voltage lower than 8.2 V; and the blue-line control signal detecting circuit is provided with a four diode which has an on-voltage higher than 9 V.

Preferably, the at least one LED lamp comprise at least one common-anode LED lamp and at least one common-cathode LED lamp.

Preferably, the red lamp beads of the common-anode LED lamp and the red lamp beads of the common-cathode LED lamp are connected in series, and a first triode is arranged between the red lamp beads of the common-anode LED lamp and the red lamp beads of the common-cathode LED lamp; the green lamp beads of the common-anode LED lamp and the green lamp beads of the common-cathode LED lamp are connected in series, and a second triode is arranged between the green lamp beads of the common-anode LED lamp and the green lamp beads of the common-cathode LED lamp; and the blue lamp beads of the common-anode LED lamp and the blue lamp beads of the common-cathode LED lamp are connected in series, and a third triode is arranged between the blue lamp beads of the common-anode LED lamp and the blue lamp beads of the common-cathode LED lamp.

The LED lamp system driven by a two-wire transmission circuit provided by the invention has the following beneficial effects:

In the invention, the LED lamp system is provided with the R, G, B control signal detecting circuits which are capable of detecting/extracting the red-line control signal, the green-line control signal and the blue-line control signal from a combined control signal transmitted by the two-wire transmission circuit. The extracted red-line control signal, the green-line control signal and the blue-line control signal are configured for driving red, green and blue lamp beads on LED lamps of the LED lamp system respectively. Different from existing lamp control systems, by adopting a two-wire transmission circuit, RGB control signals can be integrated into a combined control signal to be transmitted by the two-wire transmission circuit without a traditional four-wire system. The LED lamp system of the present invention supports transformation on the traditional four-wire system. The combined control signal can be output by a controller or a converter connected to an output terminal of the four-wire system to realize transformation of an existing four-wire control system, such that the transformation cost of existing lamp systems is greatly reduced. The LED lamp system can be controlled by control signals transmitted via a two-wire transmission circuit, which greatly reduces the wiring cost, use cost and maintenance cost.

DESCRIPTION OF THE EMBODIMENTS

The following is a further description of a luminaire system for two-wire transmitting control signals provided by the present disclosure in combination with the figures. It should be pointed out that the technical solution and the design principle of the present disclosure are elaborated in the following with only one optimized technical solution.

Figure 1:
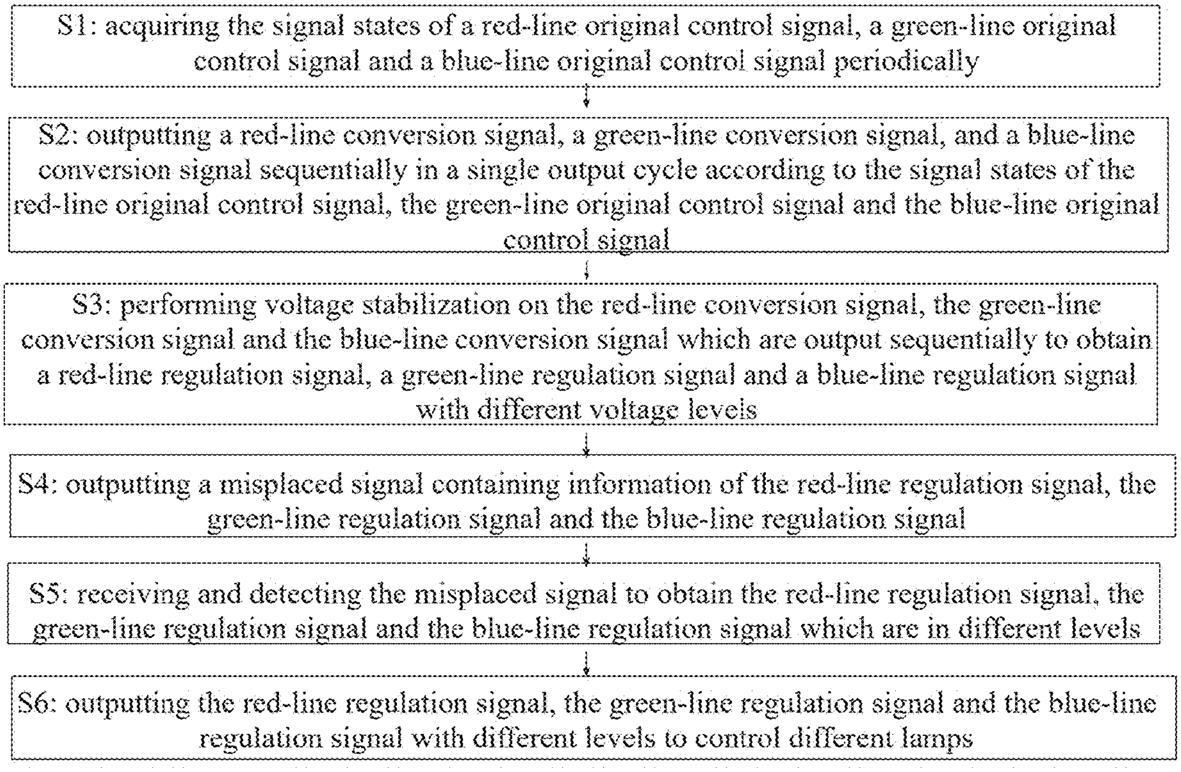
FIG. 1 is a flowchart of a method of controlling a luminaire system provided by the present disclosure.

In the entire description of the present disclosure, it is to be noted that, for orientation words, such as the terms “center”, “horizontal”, “longitudinal”, “lateral”, “length”, “width”, “thickness”, “upper”, “lower”, “front”, “back”, “left”, “right”, “vertically”, “perpendicularly”, “horizontally”, “top”, “bottom”, “inside”, “outside”, “clockwise”, “counterclockwise” and the like indicating orientation and positional relationships are orientation or positional relationships based on those shown in the figures or commonly referred to by those skilled in the art, and are only intended to facilitate the recitation of the present disclosure and to simplify the description, and are not intended to indicate or imply that the device or element referred to must have a particular orientation, be constructed and operated in a particular orientation, and are not to be construed as limiting the specific scope of the present disclosure FIG. 1 is a flowchart of a method of controlling a luminaire system provided by the present disclosure. Although specifics steps are disclosed in FIG. 1, these steps are only examples. That is, the present disclosure is well suited to perform various other steps or variations of the steps recited in FIG. 1. Specifically, the luminaire system provides a method of transmitting four-wire control signals by two wires.

Step S1: collecting the signal states of a red-line original control signal, a green-line original control signal and a blue-line original control signal periodically. FIG. 1 will be described in combination with FIG. 2, RIN, GIN and BIN represent the red-line original control signal, the green-line original control signal and the blue-line original control signal respectively, where the red-line original control signal RIN, the green-line original control signal GIN and the blue-line original control signal BIN may be externally input or may be generated by the internal MCU.

Figure 2:
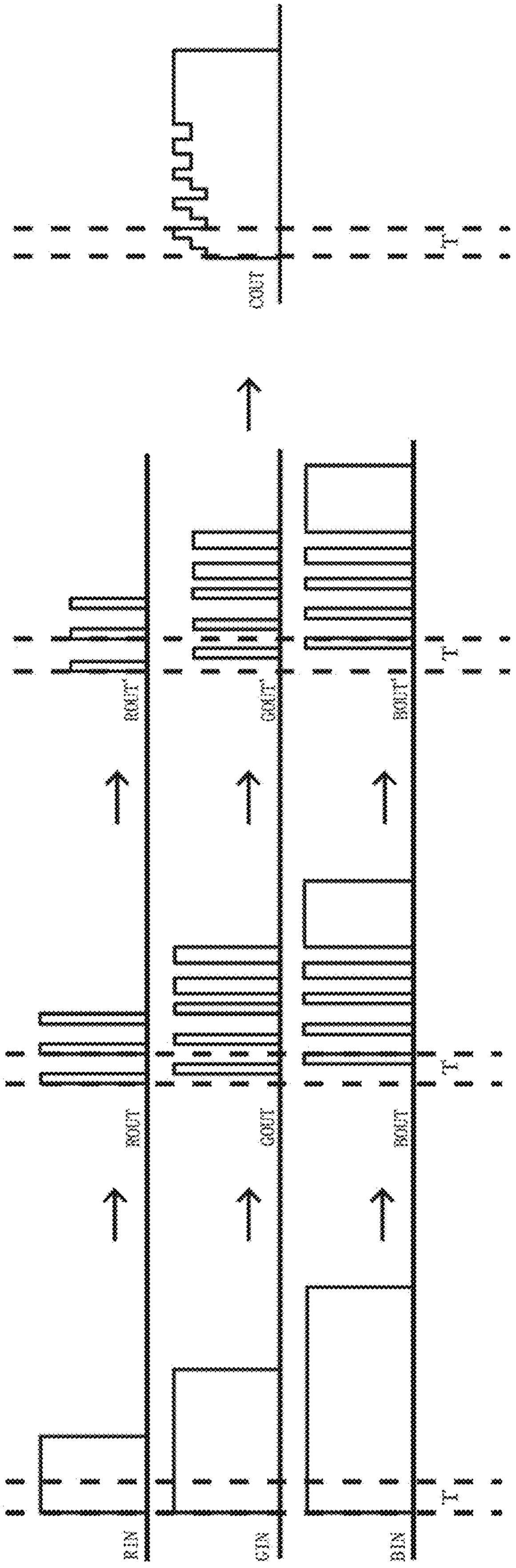
FIG. 2 is a schematic diagram illustrating changes of a plurality of original control signals, a plurality of conversion signals, a plurality of regulation control signals, and a combined control signal provided by the present disclosure.

Step S2: outputting a red-line conversion signal, a green-line conversion signal, and a blue-line conversion signal sequentially in a single output cycle according to the signal states of the red-line original control signal, the green-line original control signal and the blue-line original control signal. As shown in FIG. 2, ROUT, GOUT and BOUT represent the red-line conversion signal, the green-line conversion signal and the blue-line conversion signal respectively which are output in one cycle of T.

Step S3: performing voltage stabilization on the red-line conversion signal, the green-line conversion signal and the blue-line conversion signal sequentially to obtain a red-line regulation control signal, a green-line regulation control signal and a blue-line regulation control signal with different voltage levels from each other. As shown in FIG. 2, ROUT', GOUT' and BOUT' represent the red-line regulation control signal, the green-line regulation control signal and the blue-line regulation control signal respectively which are in different voltage levels with each other.

Step S4: outputting a combined control signal containing information of the red-line regulation control signal, the green-line regulation control signal and the blue-line regulation control signal. As shown in FIG. 2, COUT represents the combined control signal.

Step S5: receiving and detecting the combined control signal to obtain the red-line regulation control signal, the green-line regulation control signal and the blue-line regulation control signal which are in different voltage levels.

Step S6: outputting the red-line regulation control signal, the green-line regulation control signal and the blue-line regulation control signal with different voltage levels to control lamps respectively.

In the present disclosure, the RGB three-line regulation control signals are integrated into a combined control signal to be transmitted by two wires. The combined control signal can carry the control information of the red-line regulation control signal, the green-line regulation control signal and the blue-line regulation control signal which are in different voltage levels. The red-line regulation control signal, the green-line regulation control signal and the blue-line regulation control signal are then extracted from the combined control signal by a voltage detecting unit in a load module which receives the combined control signal from the two wires. The RGB three-line regulation control signals are used to drive the RGB lamp beads on the LED lamp. Adding a detecting unit to the lamps can perform the transmission of the control signals with two wires, such that needs to access the lamps through a four-wire system in order to perform the control of the lamps can be eliminated.

In some embodiments, the signal states of the control signals are specifically high level and/or low level. Alternatively, the signal states of the control signals are specifically with signal or without signal. It is understood that the signal states of RGB control signals are distinguished by a high level/with signal and a low level/without signal. In the actual circuitry, the color or brightness to be output from the lamp can be controlled by a control signal with high level or low level, or with or without a signal. The difference is that the detection method of high and low levels or with and without signals is not consistent. Therefore, either high and low levels or with and without signals are the control information carried by the signal states, where the signal states can be understood as determining whether or not to output the conversion signal based on the control information carried by the signal states.

FIG. 2 is a schematic diagram illustrating changes of a plurality of original control signals, a plurality of conversion signals, a plurality of regulation control signals, and a combined control signal provided by the present disclosure. Further, in some embodiments, the signal states of a red-line original control signal, a green-line original control signal and a blue-line original control signal are acquired during a sampling cycle, wherein the single output cycle being equal to the sampling cycle. As shown in FIG. 2, both the sampling cycle and the output cycle are fixed, e.g., both the sampling cycle and the output cycle are set to 9 microseconds.

Further, in some embodiments, except for the first acquisition of the signal states of the red-line original control signal, the green-line original control signal and the blue-line original control signal, the signal states of the red-line original control signal, the green-line original control signal and the blue-line original control signal are re-acquired whenever the single output cycle is ended. In this case, both the acquisition cycle and the output cycle are not fixed, but each-line conversion control signal output is output according to a predetermined duration. It can be understood that when the red-line conversion control signal, the green-line conversion control signal and the blue-line conversion control signal are needed to be output in a single output cycle, under the output cycle, the output duration of each conversion control signal is 3 microseconds, then the single output cycle is 9 microseconds. When the green-line conversion control signal and the blue-line conversion control signal are needed to be output in a single output cycle, under the output cycle, the output duration of each conversion control signal is 3 microseconds, and so on. Whenever all conversion signals are output to end this output cycle, and the signal states of the red-line original control signal, the green-line original control signal, and the blue-line original control signal are started to re-acquire. That is to say, the output duration of each conversion control signal is fixed in this case, and according to the different signal state of each original control signal, each acquisition cycle and output cycle are variable.

Furthermore, as shown in FIG. 2, when the signal states of the red-line original control signal, the green-line original control signal and the blue-line original control signal are all at high levels/with signals, the combined control signal consists of information of the red-line regulation control signal, the green-line regulation control signal and the blue-line regulation control signal wherein the proportion of the red-line regulation control signal, the green-line regulation control signal and the blue-line regulation control signal in the combined control signal are same and equal to ⅓. When two of the signal states of the red-line original control signal, the green-line original control signal and the blue-line original control signal are at high levels/with the signals, the combined control signal consists of information of two regulation control signals corresponding to the original control signals having the signal states of high levels/with the signals, wherein the proportion of the each control signal corresponding to each original control signals having the signal state of high level/with the signal in the combined control signal is same and equals to ½. When only one of the signal states of the red-line original control signal, the green-line original control signal and the blue-line original control signal is at a high level/with a signal, the regulation control signal corresponding to the original control signal having the signal state of a high level forms the combined control signal.

It is understood that every time an acquisition cycle is adopted to acquire an original control signal, the valid original control signal acquired at this time needs to output three conversion signals in sequence to complete the conversion output of the signal. Because of the misplaced output, it is necessary to convert the original control signals acquired at the same time after the acquisition is completed in each acquisition cycle, and then output them based on different times, to form the misplaced output. Since the human eye has a visual phenomenon of temporary, the human visual temporary time is about 0.2 seconds, and the signal conversion processing using the method is microseconds, so we do not feel the flicker of the lamps. The form of the original control signal when it is finally transmitted to the lamp changes, but the output effect remains.

Furthermore, as shown in FIG. 2, when the signal states of the red-line original control signal, the green-line original control signal and the blue-line original control signal are all at the high level/with signals, the combined control signal consists of information of the red-line regulation control signal, the green-line regulation control signal and the blue-line regulation control signal with different voltage levels from each other, wherein the proportion of the red-line control signal, the green-line control signal and the blue-line control signal in the combined control signal are same and equal to ⅓. When two of the signal states of the red-line original control signal, the green-line original control signal and the blue-line original control signal are at high levels/ with the signals, the combined control signal consists of information of two regulation control signals corresponding to the two original control signals having signal states of high levels/with the signals, wherein the proportion of the each regulation control signal corresponding to the each original control signal having the signal state of high level/ with the signal in the combined control signal is same and equals to ½. When only one of the signal states of the red-line original control signal, the green-line original control signal and the blue-line original control signal is at a high level/with a signal, the regulation control signal corresponding to the original control signal having the signal state of a high level forms the combined control signal. It should be understood that regardless of settings of the acquisition cycle and output cycle, the proportion of each regulation control signal in the combined control signal is constant. It should be understood that when the signal state of one of the original control signals is at a low level/without a signal, the corresponding conversion signal of that wire will not be output. It is to be noted that here the conversion signal is output when the signal state of the corresponding original control signal is at a high level/with a signal, and based on the characteristics of the circuit, it is also possible to output the conversion signal when the signal state of corresponding original control signal is at a low level/ without a signal, and the options are only defined based on the characteristics of the circuit design, and the principles are the same, so it is no need to make further elaboration herein.

In some embodiments, as shown in FIG. 2, the voltage levels of the red-line regulation control signal, the green-line regulation control signal and the blue-line regulation control signal are different with each other wherein the voltage level of the blue-line regulation control signal is greater than the green-line regulation control signal, and the voltage level of the green-line regulation control signal is greater than the red-line regulation control signal. In this embodiment, the order of the corresponding levels of the regulation control signals are arranged in accordance with the characteristics of the lamp beads of each color, and, of course, there can also be other arrangements, it is no need to make further elaboration herein.

Figure 3:
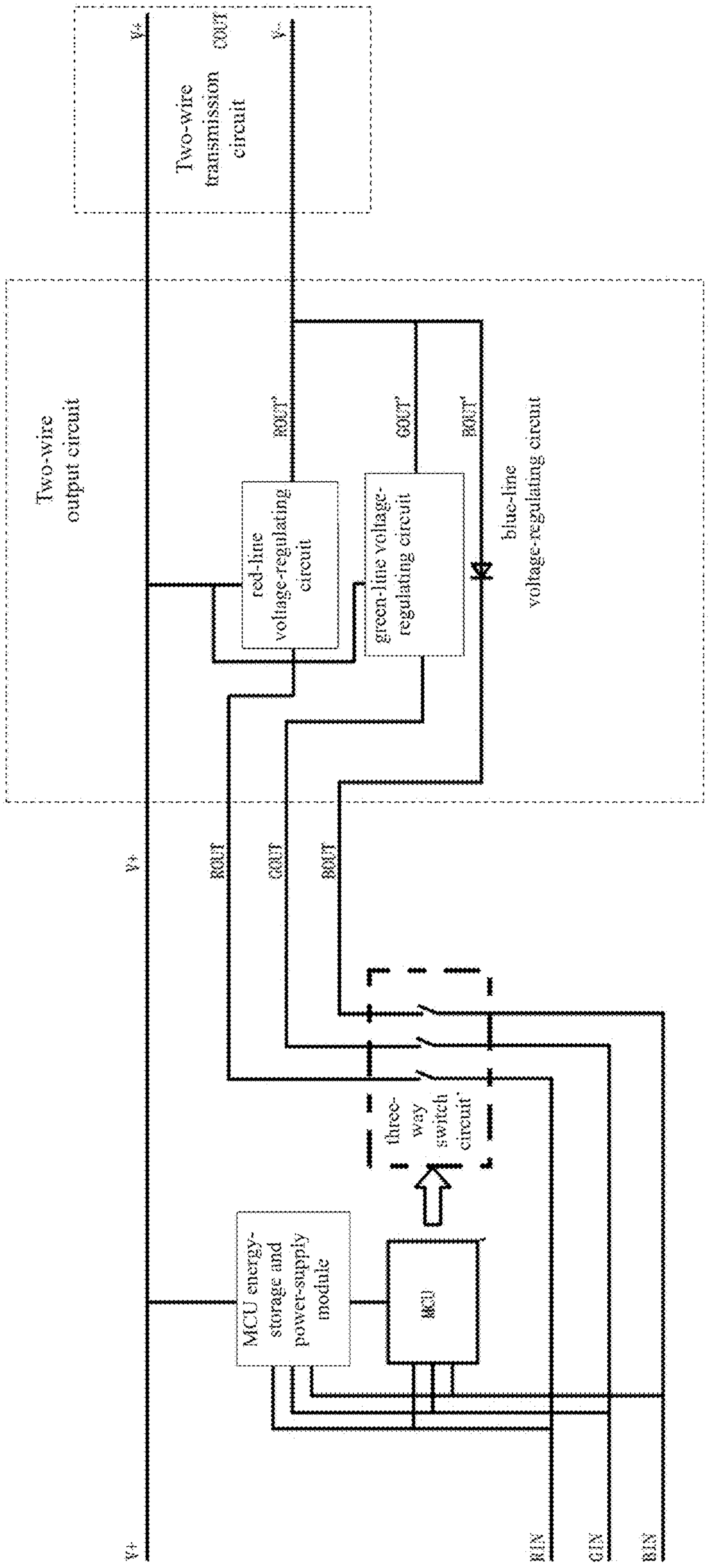
FIG. 3 is a schematic diagram illustrating a controller in a luminaire system provided by the present disclosure.

FIG. 3 is a schematic diagram illustrating a controller in a luminaire system provided by the present disclosure. FIG. 3 will be described in combination with FIG. 2. In one embodiment, the controller in the luminaire system includes a processor MCU, a tree-way switch circuit, and a two-wire output circuit having a red-line voltage-regulating circuit, a green-line voltage-regulating circuit and a blue-line voltage-regulating circuit. The processor MCU is configured to generate a red-line conversation signal, a green-line conversation signal and a green-line conversation signal by collecting the signal states of a red-line original control signal, a green-line original control signal and a bule-line original control signal. Specifically, RIN, GIN and BIN represent the red-line original control signal, the green-line original control signal and the blue-line original control signal respectively, wherein the red-line original control signal, the green-line original control signal and the blue-line original control signal are externally input as shown in FIG. 3. In other embodiment, the red-line original control signal, the green-line original control signal and the blue-line original control signal can be generated by the processor MCU in FIG. 3. The tree-way switch circuit is configured to output the red-line conversation signal ROUT, the green-line conversation signal GOUT and the blue-line conversation signal BOUT in sequence. The two-wire output circuit is configured to regulate the red-line conversation signal ROUT, the green-line conversation signal GOUT and the blue-line conversation signal BOUT to obtain a red-line regulation control signal ROUT', a green-line regulation control signal GOUT' and a blue-line regulation control signal BOUT', and generate a combined control signal COUT by combining the red-line regulation control signal ROUT', the green-line regulation control signal GOUT' and the blue-line regulation control signal BOUT'. As shown in FIG. 2, the combined control signal COUT is generated by combining ROUT', GOUT' and BOUT'. In one embodiment, the voltage level of the red-line regulation control signal ROUT' equals to 6V, the voltage level of the green-line regulation control signal GOUT' equals to 8V and the voltage level of the blue-line regulation control signal equals to 9V.

Figure 4:
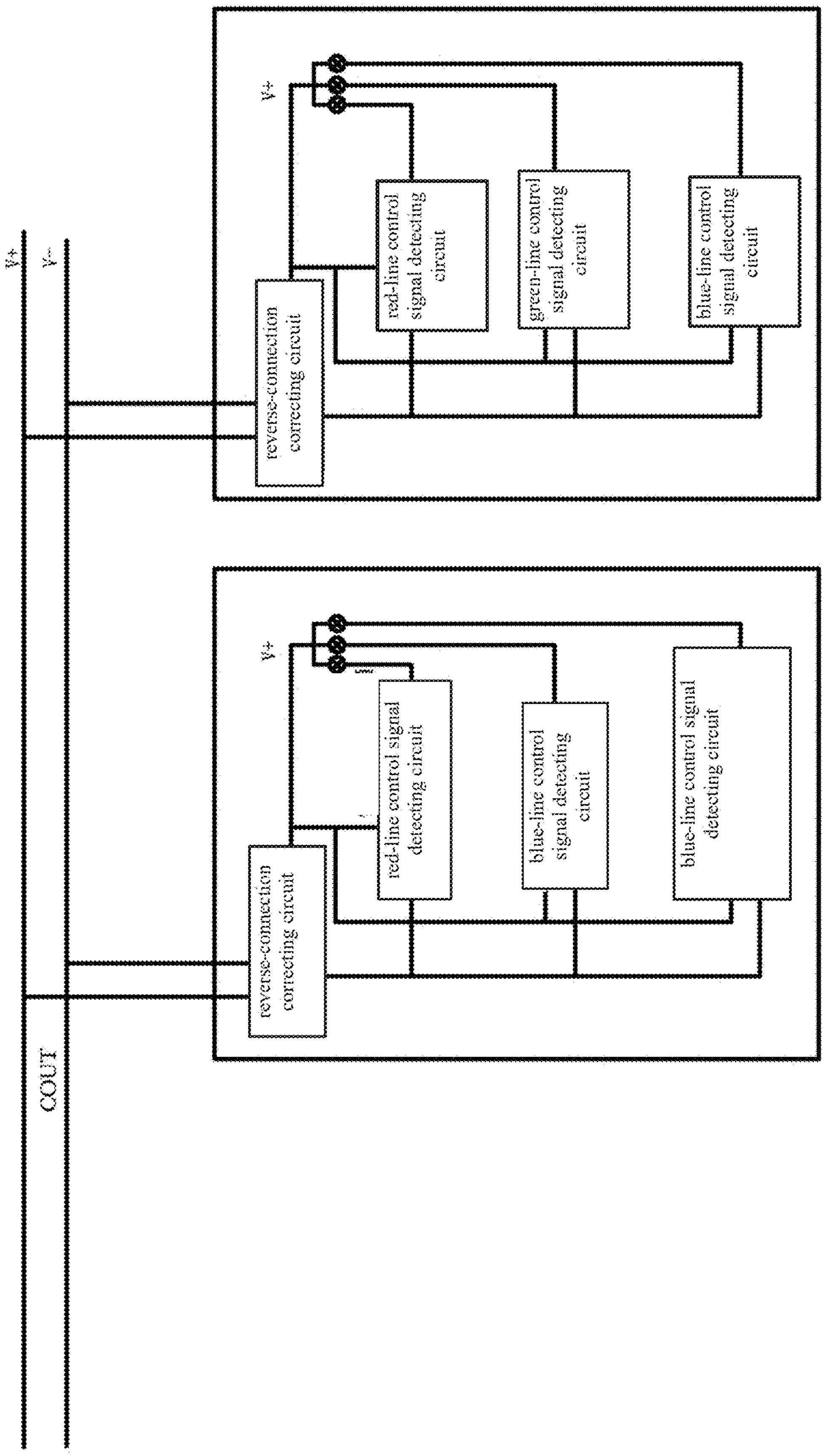
FIG. 4 is a schematic diagram illustrating a load module in a luminaire system provided by the present disclosure.
Figure 4A:
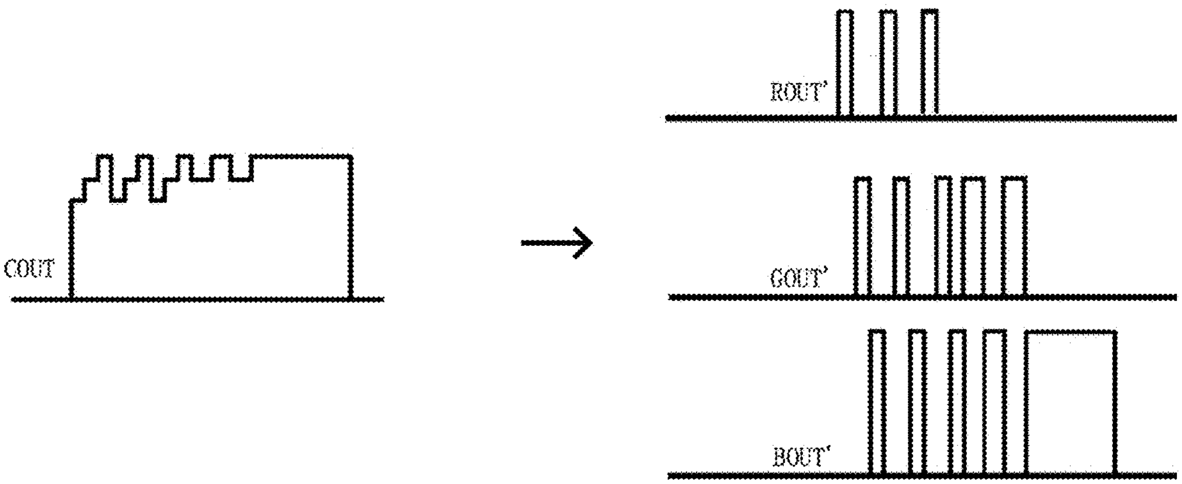
FIG. 4A is a schematic diagram illustrating a combined control signal being separated to three control signals provided by the present disclosure.

FIG. 4 is a schematic diagram illustrating a load module in a luminaire system provided by the present disclosure. As shown in FIG. 4, the load module includes a reverse-connection correcting circuit, a red-line control signal detecting circuit, a green-line control signal detecting circuit, a blue-line control signal detecting circuit and at least one LED lamp. In one embodiment, the reverse-connection correcting circuit is a bridge rectifier circuit for rectifying a combined control signal to increase the commonality of a luminaire system. Also, the red-line control signal detecting circuit is configured to detect the combined control signal, when the voltage value of a segment of the combined control signal is lower than A, this segment of the combined control signal is detected as a red-line regulation control signal, when the voltage value of a segment of the combined control signal is lower than C and greater than B, this segment of the combined control signal is detected as a green-line regulation control signal; finally, when the voltage value of one segment of the combined control signal is greater than D, this segment of the combined control signal is detected as a blue-line regulation control signal. It should be understood that the values of A, B, C and D may be defined based on the level of the original control signals, or may be determined based on a range value. For example, when the voltage value of a segment of the combined control signal falls within 6-6.8V, the segment of the combined control signal is detected as a red-line regulation control signal; when the voltage value of a part of the combined control signal is greater than 6.8V and falls within 8-8.2V, the segment of the combined control signal is detected as a green-line regulation control signal; when the voltage value of the segment of the combined control signals falls within 9-9.1V, the segment of the combined control signal is detected as a blue-line regulation control signal.

Further, the red-line regulation control signal, the green-line regulation control signal and the blue-line regulation control signal turn on a red lamp bead, a green lamp bead and a blue lamp bead respectively. It is known by the skilled person in present technical field, there are signal fluctuation when the control signals are transmitted between the luminaire system, the regulation control signals can be detected by setting a range value.

In some embodiments, as shown in FIG. 2, the combined control signal consists information of the red-line regulation control signal, the green-line regulation control signal, and the blue-line regulation control signal in sequence. In fact, the order of the red-line regulation control signal, the green-line regulation control signal, and the blue-line regulation control signal in the combined control signal may be in other orders as well. The ordering of the red, the green, and the blue is intended to correspond to the level of the respective regulation control signal, and to reduce the frequency of the rise and fall of the level in order to reduce interference.

More Specifically, referring to FIG. 3 and FIG. 4, the present disclosure provides a luminaire system for transmitting control signals with two wires. The luminaire system comprises: a controller, a two-wire transmission circuit having two wires, and a load module, wherein the controller is coupled to the load module via the two-wire transmission circuit.

As shown FIG. 3, the controller includes a processor MCU, a three-way switch circuit and a two-wire output circuit. The controller is configured to output a combined control signal consisting of a red-line regulation control signal, a green-line regulation control signal and a blue-line regulation control signal. The processor MCU is configured to control the three-way switch circuit to output the red-line conversion signal, the green-line conversion signal and the blue-line conversion signal to the two-wire output circuit sequentially, in accordance with the signal states of the original red-line control signal, the original green-line control signal and the original blue-line control signal. The two-wire output circuit is configured to regulate/stabilize the voltages of the red-line conversion signal, the green-line conversion signal and the blue-line conversion signal by the red-line regulation circuit, the green-line regulation circuit and the blue-line regulation circuit, such that the red-line regulation control signal, the green-line regulation control signal and the blue-line regulation control signal can be obtained, and then these regulation control signals are combined to form the combined control signal which is output through the two-wire output circuit.

Figure 12:
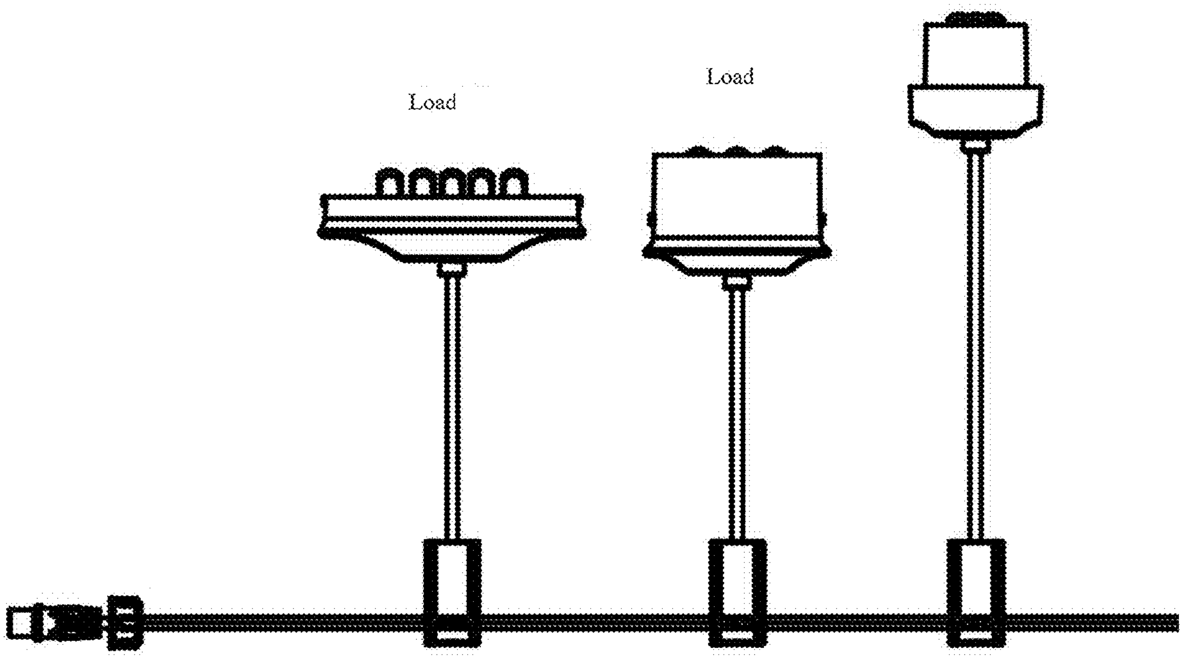
FIG. 12 is a schematic diagram illustrating a plurality of loads coupled to a controller via a two-wire transmission circuit in a luminaire system provided by the present disclosure.

As shown in FIG. 3, FIG. 4 and FIG. 12, a controller for transmitting control signals is disclosed, the controller further comprises a two-wire transmission circuit having two wires which is configured to transmit the combined control signal to the load module. The controller is used to output the combined control signal.

As shown in FIG. 4 and FIG. 12, the luminaire system comprises at least one load module comprising a red-line control signal detecting circuit, a green-line control signal detecting circuit, a blue-line signal detecting circuit and at least one LED lamp. The load module is configured to receive the combined control signal from the controller and to detect if the combined control signal including a red-line regulation control signal, a green-line regulation control signal and a blue-line regulation control signal through the red-line control signal detecting circuit, the green-line control signal detecting circuit and the blue-line control signal detecting circuit, respectively. The red-line regulation control signal, the green-line regulation control signal, and the blue-line regulation control signal are configured to drive and control red lamp beads, green lamp beads, and blue lamp beads on the LED lamp to turn on/off, respectively.

Figure 5:
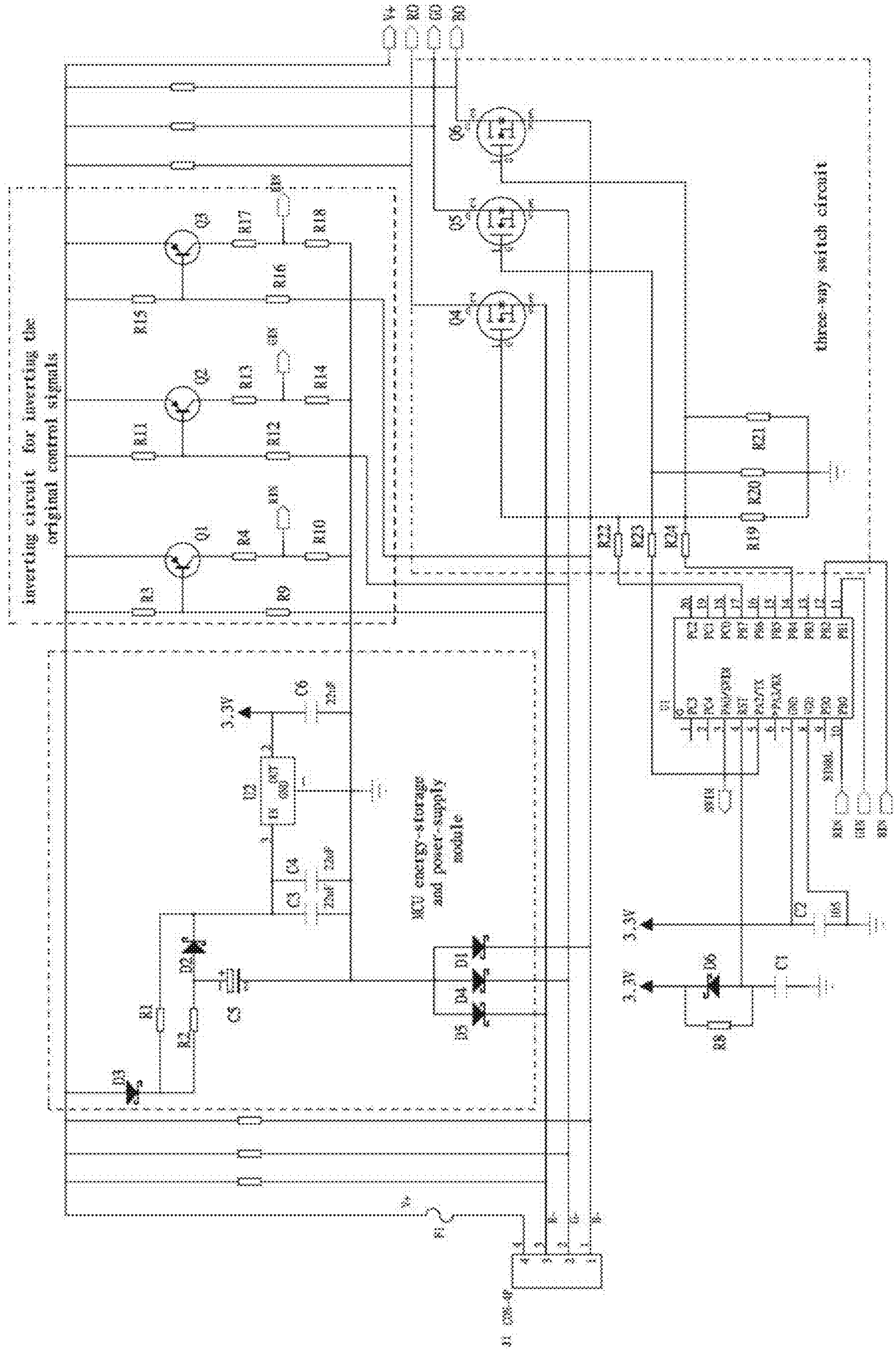
FIG. 5 is a circuit diagram illustrating a processor and a three-way switch circuit when a controller receiving a plurality of original control signals from outside module provided by the present disclosure which is used as a converter.

FIG. 5 is a part circuit diagram illustrating a processor and a three-way switch circuit when a controller receiving a plurality of control signals from outside module provided by the present disclosure which is used as a converter. For, example, the processor receives the control signals RIN, GIN and BIN from external module. FIG. 5 will be described in combination with FIG. 3. Specifically, referring to FIG. 5, in a specific embodiment, when the controller is used as a converter, the processor not only includes a processor U1, a three-way switch circuit electrically connected to the processor U1, and a two-wire output circuit electrically connected to the three-way switch circuit, but the controller also includes an MCU energy-storage and power-supply module configured to temporarily supply power to the processor U1, an inverting circuit for inverting the original control signals and other external circuitry.

As shown in FIG. 3 and FIG. 5, the tree-way switch circuit includes three MOS switches Q4, Q5 and Q6 which are turned on/off by the red-line control signal, the green-line control signal and the blue-line control signal respectively, and outputs the red-line conversation signal ROUT, the green-line conversation signal GOUT and the blue-line conversation signal BOUT respectively. It should be understood the MOS switches listed above can be other switches. Moreover, the controller further includes an inverting circuit for inverting the original control signals RIN, GIN and BIN. And, the processor in FIG. 5 is configured to receive the original control signals RIN, GIN and BIN from external module, and the MOS switches Q4, Q5 and Q6 output the red-line conversation signal R0, the green-line conversation signal GO and the blue-line conversation signal B0 in sequence. Additionally, the MCU energy-storage and power-supply module is configured to temporarily supply power to the processor U1, the inverting circuit is configured to invert the original control signals and other external circuitry. As shown in FIG. 5, the MCU energy-storage and power-supply module includes the diodes D1, D4 and D5 configured for integrating the regulation control signals, a capacitor C5, a diode D2, resistors R1, R2, and a diode D3 for energy storage circuitry, a processor U2 for controlling the power supply, as well as external capacitors C3, C4 and C6 connected with the processor U2. The inverting circuit is further configured to prevent misreading of the original control signals by the processor U1. The inverting circuit comprises a red-line inverting circuit, a green-line inverting circuit, and a blue-line inverting circuit. The red-line inverting circuit comprises a transistor Q1, resistors R3, R4, R9 and R10. The green-line inverting circuit comprises a transistor Q2, resistors R11, R12, R13 and R14. The blue-line inverting circuit comprises a transistor Q3, resistors R15, R16, R17 and R18. In one embodiment, the three-way switch circuit also includes resistors R19, R20, R21, R22, R23 and R24. As shown in FIG. 5, an end G of the MOS Q4 is connected to the processor U1 through the resistor R22, and the end G of transistor Q4 is connected to ground through the resistor R19. An end S of Q4 is connected to the red original control signal, and an end D of Q4 is connected to the red-line voltage-regulating circuit (not shown in FIG. 5). Taking the MOS Q4 in the figures as an example, the electrical relationships between MOS Q5, Q6 and other resistors are similar with the MOS Q4, it is no need to make further elaboration herein.

Figure 6:
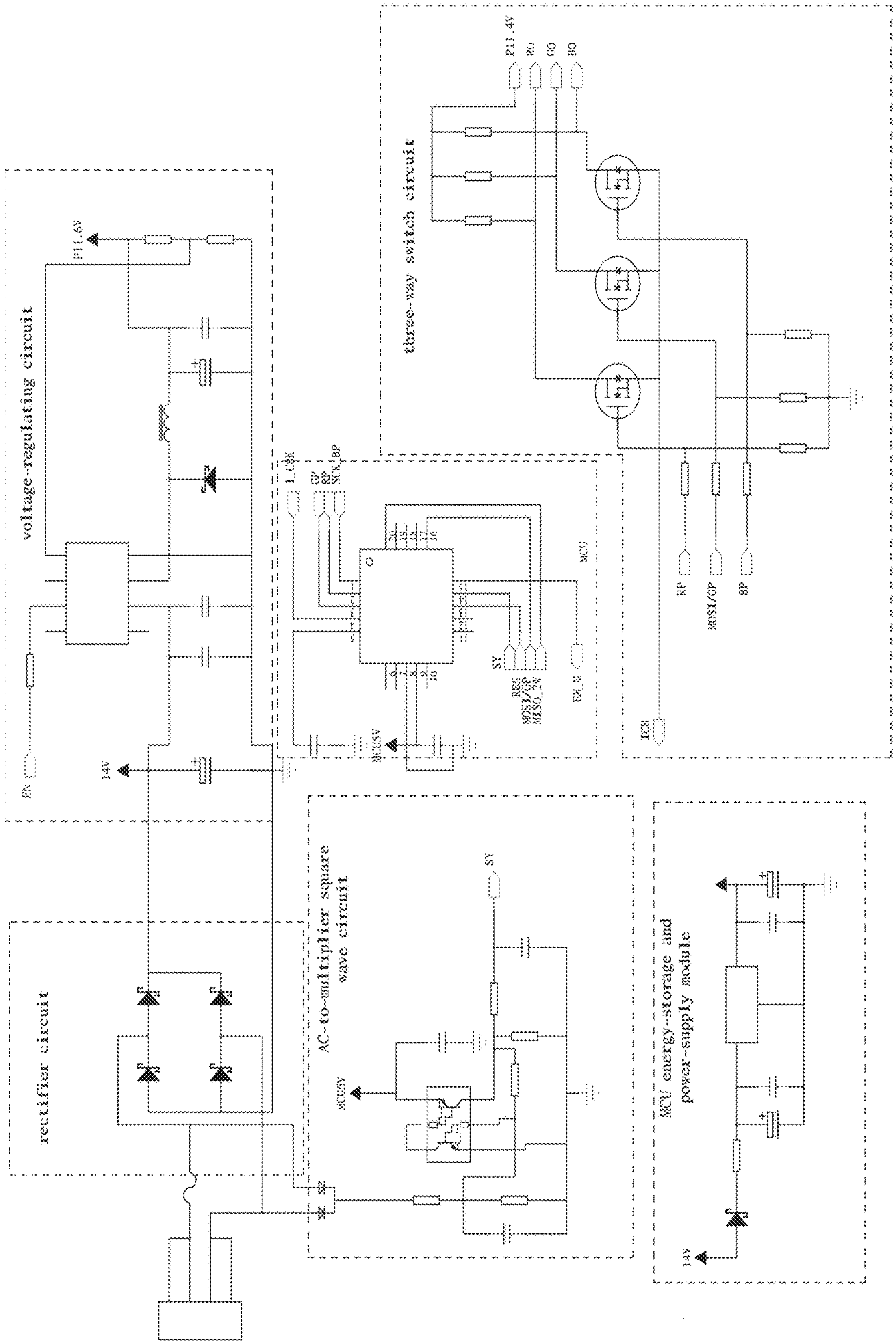
FIG. 6 is a circuit diagram illustrating a processor and a three-way switch circuit when a controller generating a plurality of original control signals by itself provided by the present disclosure which is used as a signal generating controller.

FIG. 6 is a circuit diagram illustrating a processor and a three-way switch circuit when a controller generating a plurality of original control signals by itself provided by the present disclosure which is used as a signal generating controller. As shown in FIG. 6, the processor MCU in the controller generates the red-line original control signal, the green-line original control signal and the blue-line original control signal (not shown in FIG. 6). Specifically, the controller further includes a rectifier circuit, a voltage-regulating circuit, an AC-to-multiplier square wave circuit, and a MCU energy-storage and power-supply circuit. When the AC-to-multiplier square wave circuit makes the input voltage gradually rise or fall by two unequal thresholds, and its transmission characteristics have the shape of a hysteresis curve, which has a better anti-interference capability and prevents the processor from generating a non-essential control signal when detecting an interference signal.

Figure 7:
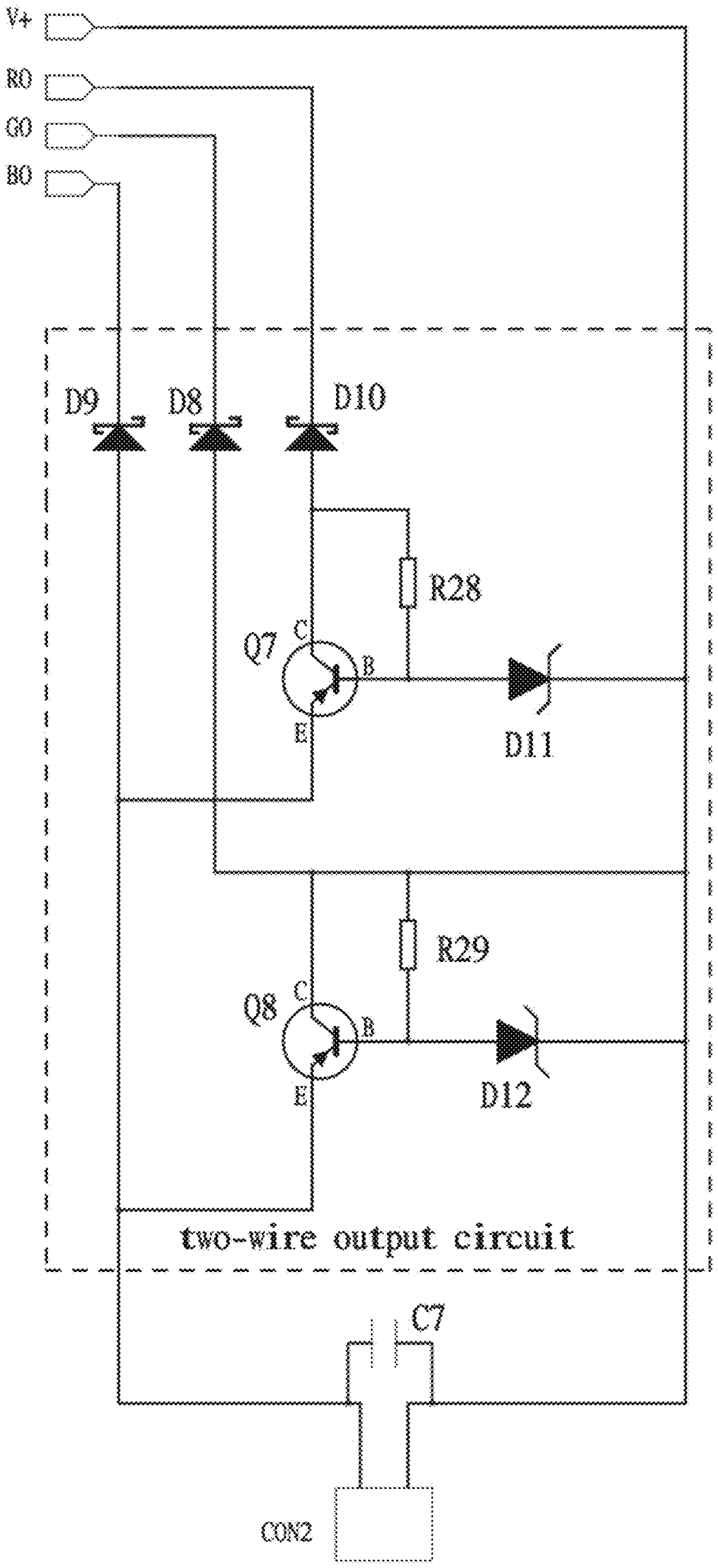
FIG. 7 is a circuit diagram illustrating a two-wire output circuit in a controller provided by the present disclosure.

FIG. 7 is a circuit diagram illustrating a two-wire output circuit in a controller provided by the present disclosure. As shown in FIG. 7, the two-wire output circuit includes an isolation circuit having three diodes D10, D8, and D9 in parallel connection, which are configured to shield the interference of the other two conversion signals when one of the conversion signals is transmitting. In this embodiment, the two-wire output circuit further includes a red-line voltage-regulating circuit, a green-line voltage-regulating circuit, and a blue-line voltage-regulating circuit which form a voltage-regulating circuit. The red-line voltage-regulating circuit includes a triode Q7, a resistor R28 and a diode D11, where the ends C, B and E of the triode Q7 are electrically connected to the diodes D10, D11 and an output interface CON2, respectively. The resistor R28 is electrically connected to the ends C and B of the triode Q7, and the diode D11 is also electrically connected to an output interface CON2. The green-line voltage-regulating circuit includes a triode Q8, a resistor R29 and a diode D12, where the ends C, B and E of the triode Q8 are electrically connected to the diodes D8, D12 and the output interface CON2, respectively. The resistor R29 is electrically connected to the ends C, B of the triode Q8, and the diode D12 is also electrically connected to the output interface CON2. The blue-line voltage-regulating circuit is composed of the diode D9.

Referring to FIG. 3, FIG. 3 will be described in combined with FIG. 5 and FIG. 10, in some embodiments, when a combined control signal is generated according to the signal states of the original control signals input from external, the controller is used as a converter. The interfaces RIN, GIN and BIN of the processor U1 are configured to receive the original control signals from external and to control the three MOS Q, Q5 and Q6 to turn on and off sequentially, according to the signal states of the original control signals, and then output the red-line conversion signal, the green-line conversion signal and the blue-line conversion signal to the two-wire output circuit to form a combined control signal.

Figure 11:
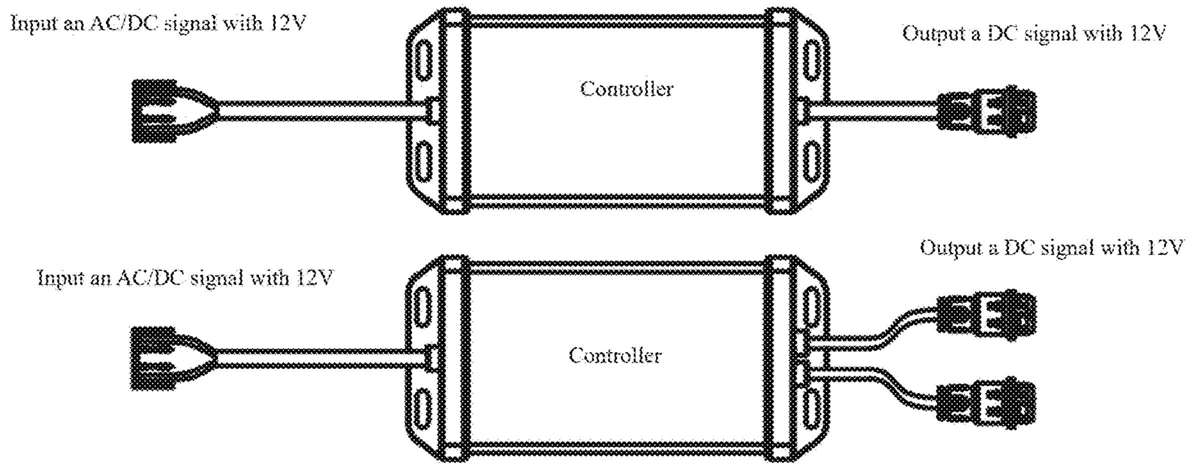
FIG. 11 is a schematic diagram illustrating another controller generating the original control signals by itself provided by the present disclosure.

Referring to FIG. 6 and FIG. 11, in some embodiments, when it is necessary to generate the original control signal by the controller itself and output the conversion signals, the controller is used to generate the original control signals. Unlike the controller described in FIG. 5, the original control signals for controlling the MOS in the three-way switch circuit is generated by the controller itself and is not obtained from the outside. When the controller is used as a signal generating controller, it not only includes a processor, a three-way switch circuit electrically connected to the processor, and a two-wire output circuit electrically connected to the three-way switch circuit, the connection relationships between the processor, the three-way switch circuit, and the two-wire output circuit are essentially the same as the processor, it is no need to make further elaboration herein. It should be noted that when the controller is used as a signal generating controller, the controller also includes a rectifier circuit, a voltage-regulating circuit, an AC-to-multiplier square wave circuit, and an MCU energy-storage and power-supply circuit. When the AC-to-multiplier square wave circuit makes the input voltage gradually rise or fall by two unequal thresholds, and its transmission characteristics have the shape of a hysteresis curve, which has a better anti-interference capability and prevents the processor from generating a non-essential control signal when detecting an interference signal.

Referring to FIGS. 4, 8, 9 and 12, in a specific embodiment, the load module further comprises a reverse-connection correcting circuit, for example, a bridge rectifier circuit that enables the lamps to disregard the specified connection of the positive and negative poles and enhances system versatility.

Figure 8:
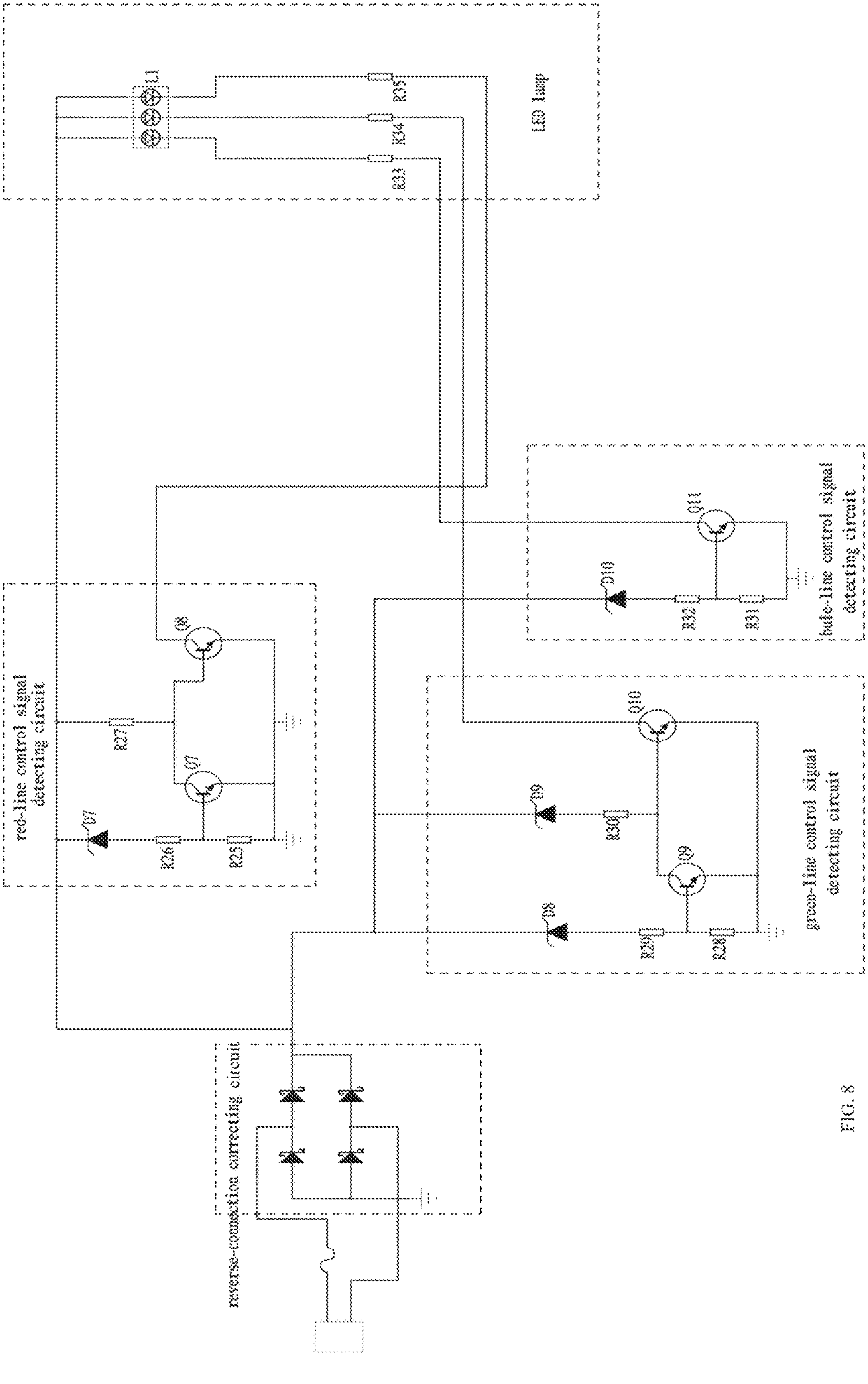
FIG. 8 is a circuit diagram illustrating another load module provided by the present disclosure.

FIG. 8 is a circuit diagram illustrating a load module in a luminaire system provided by the present disclosure. As shown in FIG. 8, the load module includes a reverse-connection correcting circuit, a red-line control signal detecting circuit, a green-line control signal detecting circuit, a blue-line control signal detecting circuit and at least one LED lamp. The reverse-connection correcting circuit is a bridge rectifier for rectifying the combined control signal to increase the commonality of the luminaire system. The red-line control signal detecting circuit includes a diode D7, a resistor R26, a resistor R25, a transistor Q7, a resistor R27 and a transistor Q8 electrically connected in turn; the green-line control signal detecting circuit includes a diode D8, a resistor R29, a resistor R28, a transistor Q9, a resistor R30, a diode D9 and a transistor Q10 electrically connected in turn; the blue control signal detecting circuit includes a diode D10, a resistor R32, a resistor R31 and a transistor Q11 electrically connected in turn. The LED lamp includes a common anode LED lamp capable to maximize the utilization of the control signals energy. In this embodiment, the on-voltage of the red-line control signal detecting circuit is 6-6.8 V, the on-voltage of the green-line control signal detecting circuit is 8-8.2 V, and the on-voltage of the blue-line control signal detecting circuit is 9-9.1 V. The red-line control signal detecting circuit is provided with a diode D7 which has an on-voltage lower than 6.8 V; the green-line control signal detecting circuit is provided with a diode D8 which has an on-voltage higher than 6.8 V and a diode D9 which has an on-voltage lower than 8.2 V; and the blue-line control signal detecting circuit is provided with a diode D10 which has an on-voltage higher than 9 V.

Figure 9:
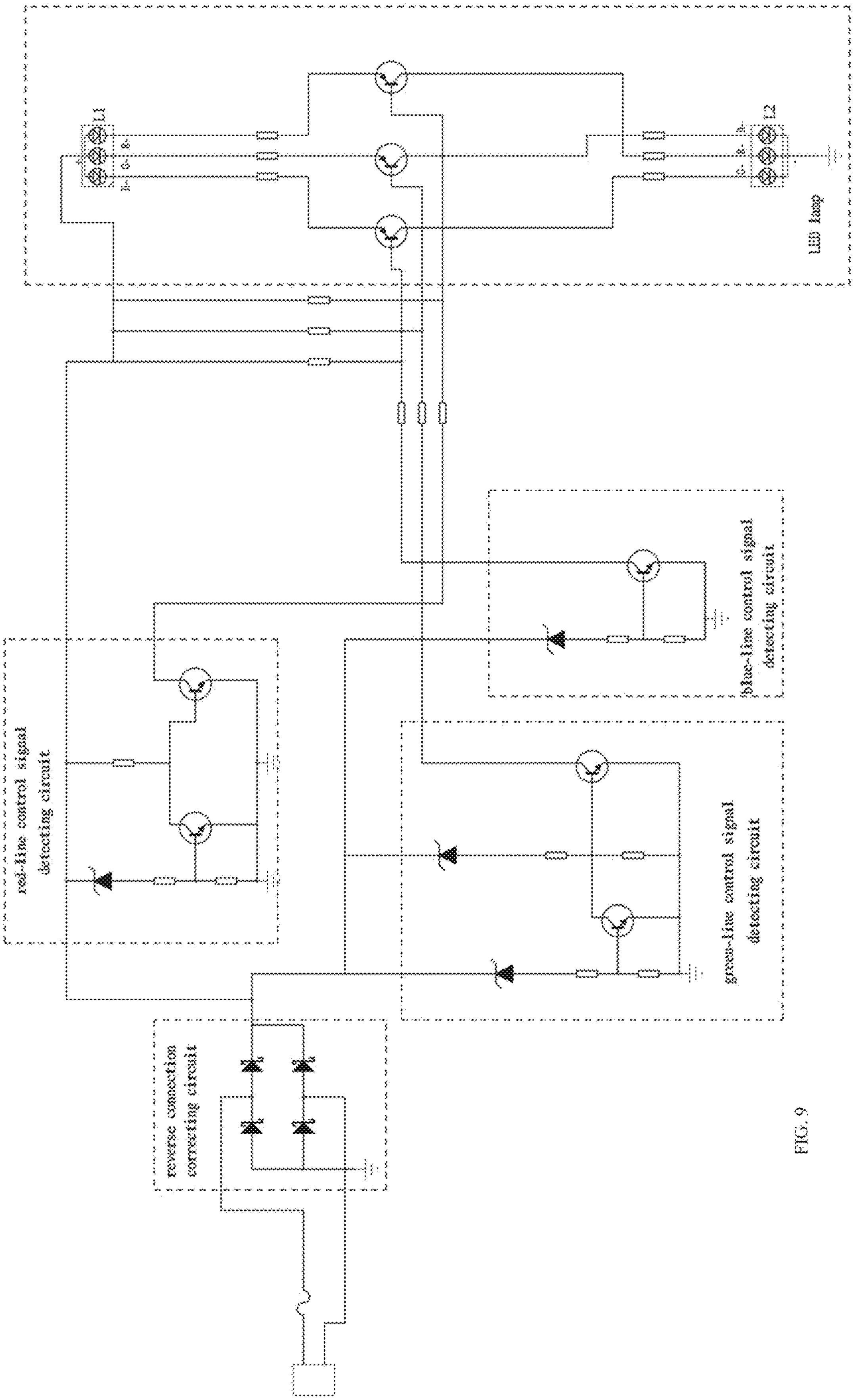
FIG. 9 is a circuit diagram illustrating another load module provided by the present disclosure.

FIG. 9 is a circuit diagram illustrating another load module provided by the present disclosure. In one embodiment, the LED lamps in the load module include a common anode LED lamp and a common cathode LED lamp, wherein a transistor is also connected between the three lamp beads of the common anode LED lamp and the three lamp beads of the common cathode LED lamp. The common cathode and the common anode LED lamps are capable to maximize the utilization of the control signal energy. Of course, numbers of the common anode LED lamp and the common cathode LED lamp are not limited to one, but also more than one, the connection method is similar to the present embodiment, it is no need to make further elaboration herein.

Figure 10:
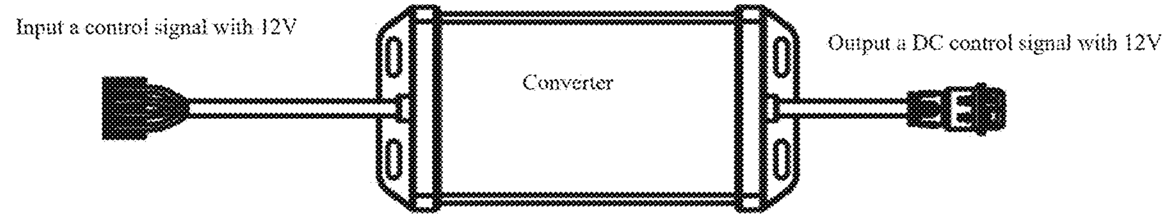
FIG. 10 is a schematic diagram illustrating a controller provided by the present disclosure when the controller receiving the original control signals from outside which is used as a converter.

FIG. 10 is a schematic diagram illustrating a controller provided by the present disclosure when the controller receiving the original control signals from outside which is used as a converter.

FIG. 11 is a schematic diagram illustrating another controller generating the original control signals by itself provided by the present disclosure.

FIG. 12 is a schematic diagram illustrating a plurality of loads coupled to a controller via a two-wire transmission circuit in a luminaire system provided by the present disclosure.

In the present disclosure, a controller for generating and outputting a combined control signal by composing three-lines regulation control signals of RGB is disclosed. The combined control signal can carry the regulation control information of the lamps of RGB three-line through the voltage of the combined control signal, then distinguish the regulation control signals of the RGB three-line on the combined control signals by the control signal detecting circuit on the load after receiving the combined control signal, and finally the regulation control signals of the RGB three-line after detecting from the combined control signal to drive the red, green and blue lamp beads on the LED lamp. Comparing with the traditional luminaire system, the combined control signal output by present luminaire system can be transmitted only with two wires, no longer need the traditional four-wire system to transmit, and the combined control signal after combining three regulation control signals can be maintained in the two-wire luminaire system, and be output a voltage during the transmission process The extended access device will not cause data loss due to abnormal power supply caused by a low-level control or no signal such as to support the expansion of the system. Finally, the method can also support the transformation of the traditional four-wire luminaire system, only need to access the controller or the converter to the input end of the four-wire luminaire system to perform transmitting of the control signal, then the output end of the controller or converter can be extended to access the subsequent lamps in a manner of two-wire luminaire system. While maintaining controlling of the lamps, and reducing the transformation cost of the traditional luminaire system, the new luminaire system can also reduce wiring, use and maintenance fec.

The above are only the preferred embodiments according to the present disclosure. It should be noted that the above preferred embodiments shall not be regarded as a limitation to the present disclosure. The scope of the present disclosure should be subject to the scope limited by the claims. For the person of ordinary skill in the art, without departing from the spirit and scope of the present disclosure, a number of improvements and embellishments can be made, and these improvements and embellishments should also be regarded as the scope of the present disclosure.

What is claimed is:

1. An LED lamp system driven by a two-wire transmission circuit, the LED lamp system comprising:

at least one LED lamp with red lamp beads, green lamp beads and blue lamp beads;

a red-line control signal detecting circuit configured to detect a red-line control signal from a combined control signal transmitted by the two-wire transmission circuit and output the red-line control signal to the red lamp beads;

a green-line control signal detecting circuit configured to detect a green-line control signal from the combined control signal transmitted by the two-wire transmission circuit and output the green-line control signal to the green lamp beads; and a blue-line control signal detecting circuit configured to detect a blue-line control signal from the combined control signal transmitted by the two-wire transmission circuit and output the blue-line control signal to the blue lamp beads;

wherein the at least one LED lamp further comprises a reverse-connection correcting circuit which is arranged between the two-wire transmission circuit and one or more of the red-line control signal detecting circuit, the green-line control signal detecting circuit and the blue-line control signal detecting circuit; and the reverse-connection correcting circuit is a bridge rectifier circuit which comprises four diodes connected end-to-end to four nodes between adjacent diodes; and a positive wire of the two-wire transmission circuit, a ground wire, a negative wire of the two-wire transmission circuit, and a common wire of the red-line control signal detecting circuit, the green-line control signal detecting circuit and the blue-line control signal are connected to the four nodes respectively.

2. The LED lamp system driven by a two-wire transmission circuit according to claim 1, wherein the at least one LED lamp comprises at least one common-anode LED lamp or at least one common-cathode LED lamp.

3. The LED lamp system driven by a two-wire transmission circuit according to claim 1, wherein the red-line control signal detecting circuit is configured for extracting the red-line control signal with a level of 6 V from the combined control signal transmitted by the two-wire transmission circuit to obtain an extracted red-line control signal with a level of 6 V and outputting the extracted red-line control signal with the level of 6 V to the red lamp beads;

the green-line control signal detecting circuit is configured for extracting the green-line control signal with a level of 8 V from the combined control signal transmitted by the two-wire transmission circuit to obtain an extracted green-line control signal with a level of 8 V and outputting the extracted green-line control signal with the level of 8 V to the green lamp beads;

the blue-line control signal detecting circuit is configured for extracting the blue-line control signal with a level of 9 V from the combined control signal transmitted by the two-wire transmission circuit to obtain an extracted blue-line control signal with a level of 9 V and outputting the extracted blue-line control signal with the level of 9 V to the red lamp beads.

4. The LED lamp system driven by a two-wire transmission circuit according to claim 1, wherein an on-voltage of the red-line control signal detecting circuit is 6-6.8 V, an on-voltage of the green-line control signal detecting circuit is 8-8.2 V, and an on-voltage of the blue-line control signal detecting circuit is 9-9.1 V.

5. The LED lamp system driven by a two-wire transmission circuit according to claim 4, wherein the red-line control signal detecting circuit is provided with a first diode which has an on-voltage lower than 6.8 V;

the green-line control signal detecting circuit is provided with a second diode which has an on-voltage higher than 6.8 V and a third diode which has an on-voltage lower than 8.2 V; and the blue-line control signal detecting circuit is provided with a four diode which has an on-voltage higher than 9 V.

6. The LED lamp system driven by a two-wire transmission circuit according to claim 1, wherein the at least one LED lamp comprises at least one common-anode LED lamp and at least one common-cathode LED lamp.

7. The LED lamp system driven by a two-wire transmission circuit according to claim 6, wherein the red lamp beads of the common-anode LED lamp and the red lamp beads of the common-cathode LED lamp are connected in series, and a first triode is arranged between the red lamp beads of the common-anode LED lamp and the red lamp beads of the common-cathode LED lamp;

the green lamp beads of the common-anode LED lamp and the green lamp beads of the common-cathode LED lamp are connected in series, and a second triode is arranged between the green lamp beads of the common-anode LED lamp and the green lamp beads of the common-cathode LED lamp; and the blue lamp beads of the common-anode LED lamp and the blue lamp beads of the common-cathode LED lamp are connected in series, and a third triode is arranged between the blue lamp beads of the common-anode LED lamp and the blue lamp beads of the common-cathode LED lamp.

8. An LED lamp system driven by a two-wire transmission circuit, the LED lamp system comprising:

at least one LED lamp with red lamp beads, green lamp beads and blue lamp beads;

a red-line control signal detecting circuit configured to detect a red-line control signal from a combined control signal transmitted by the two-wire transmission circuit and output the red-line control signal to the red lamp beads;

a green-line control signal detecting circuit configured to detect a green-line control signal from the combined control signal transmitted by the two-wire transmission circuit and output the green-line control signal to the green lamp beads; and a blue-line control signal detecting circuit configured to detect a blue-line control signal from the combined control signal transmitted by the two-wire transmission circuit and output the blue-line control signal to the blue lamp beads;

wherein an on-voltage of the red-line control signal detecting circuit is 6-6.8 V, an on-voltage of the green-line control signal detecting circuit is 8-8.2 V, and an on-voltage of the blue-line control signal detecting circuit is 9-9.1 V.

9. The LED lamp system driven by a two-wire transmission circuit according to claim 8, wherein the red-line control signal detecting circuit is configured for extracting the red-line control signal with a level of 6 V from the combined control signal transmitted by the two-wire transmission circuit to obtain an extracted red-line control signal with a level of 6 V and outputting the extracted red-line control signal with the level of 6 V to the red lamp beads;

the green-line control signal detecting circuit is configured for extracting the green-line control signal with a level of 8 V from the combined control signal transmitted by the two-wire transmission circuit to obtain an extracted green-line control signal with a level of 8 V and outputting the extracted green-line control signal with the level of 8 V to the green lamp beads;

the blue-line control signal detecting circuit is configured for extracting the blue-line control signal with a level of 9 V from the combined control signal transmitted by the two-wire transmission circuit to obtain an extracted blue-line control signal with a level of 9 V and outputting the extracted blue-line control signal with the level of 9 V to the red lamp beads.

10. The LED lamp system driven by a two-wire transmission circuit according to claim 8, wherein the red-line control signal detecting circuit is provided with a first diode which has an on-voltage lower than 6.8 V;

the green-line control signal detecting circuit is provided with a second diode which has an on-voltage higher than 6.8 V and a third diode which has an on-voltage lower than 8.2 V; and the blue-line control signal detecting circuit is provided with a four diode which has an on-voltage higher than 9 V.

11. An LED lamp system driven by a two-wire transmission circuit, the LED lamp system comprising:

at least one LED lamp with red lamp beads, green lamp beads and blue lamp beads;

a red-line control signal detecting circuit configured to detect a red-line control signal from a combined control signal transmitted by the two-wire transmission circuit and output the red-line control signal to the red lamp beads;

a green-line control signal detecting circuit configured to detect a green-line control signal from the combined control signal transmitted by the two-wire transmission circuit and output the green-line control signal to the green lamp beads; and a blue-line control signal detecting circuit configured to detect a blue-line control signal from the combined control signal transmitted by the two-wire transmission circuit and output the blue-line control signal to the blue lamp beads;

wherein the red-line control signal detecting circuit is configured for extracting the red-line control signal with a level of 6 V from the combined control signal transmitted by the two-wire transmission circuit to obtain an extracted red-line control signal with a level of 6 V and outputting the extracted red-line control signal with the level of 6 V to the red lamp beads;

the green-line control signal detecting circuit is configured for extracting the green-line control signal with a level of 8 V from the combined control signal transmitted by the two-wire transmission circuit to obtain an extracted green-line control signal with a level of 8 V and outputting the extracted green-line control signal with the level of 8 V to the green lamp beads; and the blue-line control signal detecting circuit is configured for extracting the blue-line control signal with a level of 9 V from the combined control signal transmitted by the two-wire transmission circuit to obtain an extracted blue-line control signal with a level of 9 V and outputting the extracted blue-line control signal with the level of 9 V to the red lamp beads.

12. The LED lamp system driven by a two-wire transmission circuit according to claim 11, wherein the at least one LED lamp comprises at least one common-anode LED lamp and at least one common-cathode LED lamp;

the red lamp beads of the common-anode LED lamp and the red lamp beads of the common-cathode LED lamp are connected in series, and a first triode is arranged between the red lamp beads of the common-anode LED lamp and the red lamp beads of the common-cathode LED lamp;

the green lamp beads of the common-anode LED lamp and the green lamp beads of the common-cathode LED lamp are connected in series, and a second triode is arranged between the green lamp beads of the common-anode LED lamp and the green lamp beads of the common-cathode LED lamp; and the blue lamp beads of the common-anode LED lamp and the blue lamp beads of the common-cathode LED lamp are connected in series, and a third triode is arranged between the blue lamp beads of the common-anode LED lamp and the blue lamp beads of the common-cathode LED lamp.

13. The LED lamp system driven by a two-wire transmission circuit according to claim 12, wherein an on-voltage of the red-line control signal detecting circuit is 6-6.8 V, an on-voltage of the green-line control signal detecting circuit is 8-8.2 V, and an on-voltage of the blue-line control signal detecting circuit is 9-9.1 V.

* * * * *